United States Patent [19]
Hikosaka et al.

[11] Patent Number: 5,201,429
[45] Date of Patent: Apr. 13, 1993

[54] GRAVITY-FEED FLOW-RACK STORAGE SYSTEM

[75] Inventors: Tadayoshi Hikosaka; Yukio Hisada; Toshihiro Nakano, all of Shizuoka, Japan

[73] Assignee: Yazaki Industrial Chemical Co. Ltd., Japan

[21] Appl. No.: 846,389

[22] Filed: Mar. 5, 1992

[30] Foreign Application Priority Data

Dec. 27, 1991 [JP] Japan .............................. 3-113229[U]

[51] Int. Cl.⁵ .................................................. A47F 5/00
[52] U.S. Cl. ........................................ 211/59.2; 221/2
[58] Field of Search ....................... 211/59.2, 151, 182; 221/2

[56] References Cited

U.S. PATENT DOCUMENTS

| | | | |
|---|---|---|---|
| 2,234,424 | 3/1941 | Alley | 211/59.2 X |
| 3,063,534 | 11/1962 | St. Amour | 211/59.2 X |
| 3,900,112 | 8/1975 | Azzi et al. | 211/59.2 X |
| 4,754,711 | 7/1988 | Solomon | 211/182 X |
| 4,765,493 | 8/1988 | Kinney | 211/59.2 |
| 5,096,090 | 3/1992 | Schwartz et al. | 211/2 X |

*Primary Examiner*—Robert W. Gibson, Jr.
*Attorney, Agent, or Firm*—Eric P. Schellin

[57] ABSTRACT

A storage system having a plurality of gravity-feed flow-rack cells 4 classified for a group of different stock and an indicator lamp 8 at a front end of each of the cells 4; the lamps 8 light to provide guidance and indication for stock unloading to a specific group of the cells 4 for the stock shelved therein; an electronic control unit 10 is provided to enable easy selection or reselection of the cells 4 to be picked, which includes operation buttons 13 which input in a memory of the control unit 10 data to cause the indicator lamps 8 to light up; and sensors 9 are provided in each of the cells 4 to monitor access to the cells.

5 Claims, 2 Drawing Sheets

GRAVITY-FEED FLOW-RACK STORAGE SYSTEM

BACKGROUND OF THE INVENTION

1) Field of the invention

This invention relates to a gravity-feed flow-rack storage system for production lines which permits stock shelved to be selectively picked up.

2) Description of the prior art

Gravity-feed flow rack storage systems have been widely used by factories of various manufacturing industries. Where such system is used in automobile production lines, all stock for different models are classified and stored for electronically controlled pick-up by guidance of indicators and sensors installed in each shelf designated for different stock. The automated pickup of stock is controlled by a sophisticated electronic system in which a network of personal computers or workstations at different stages of the production line is operatively connected to the indicators and sensors.

However, those prior-art flow-rack storage systems have been known to have several disadvantages owing to the very complicated design of the computerized setups employed. All or part of the shelved autoparts in a storage rack unit have to be rearrayed as when the factory orders a switch to a new or different model. This would not only necessitate changes of application software, on-screen computer commands and sequences of actions, but also rewiring of the relays in the electronic network system. None of these modifications can be done easily without the help of expertise, forcing the production line involved to suspend operations.

Another problem is that the results of such change done by computer specialists have tended to be alien to the workers who are to actually operate the system. The pickup of stock from storage racks is essentially a series of simple actions, and should therefore be systematized in such a manner which will be easily followed by even untrained workers. Moreover, basic modifications that the storage system has to make to meet a different car model involves mere readjustment of indicator lamps to properly operate for the rearranged racks for all stock employed in the new model.

There has long been demand for developing a simplified gravity-feed flow-rack storage system which permits ordinary factory workers to effect the necessary changes in an easy manner to accommodate a shift to different models of products which require different groups of parts to be picked up from the storage rack unit.

SUMMARY OF THE INVENTION

The present invention has been proposed to provide a gravity-feed flow-rack storage system which is free from the above mentioned disadvantages of conventional devices.

A primary object of the present invention is to provide such a system which permits ordinary factory workers to change operating parameters to meet new production line orders to manufacture a different kind of product, such as the readjustment of indicator lamps for rearranged racks.

The above and other objects, features and advantages of the present invention are achieved by a gravity-feed flow-rack storage system which includes an indicator lamp to identify the specific rack from which the stock shelved is being picked up and a sensor to monitor the passage of stock out of individual racks, each designated to hold a different kind of part. A control panel composed of operation buttons and a selection switch to designate a desired combination of stock to be picked up is operatively connected to the indicator lamps and sensors in such a manner.

DESCRIPTION OF THE PREFERRED EMBODIMENTS

Preferred embodiments of the storage system according to the present invention will be described in full detail in conjunction with the attached drawings.

Figure 1:
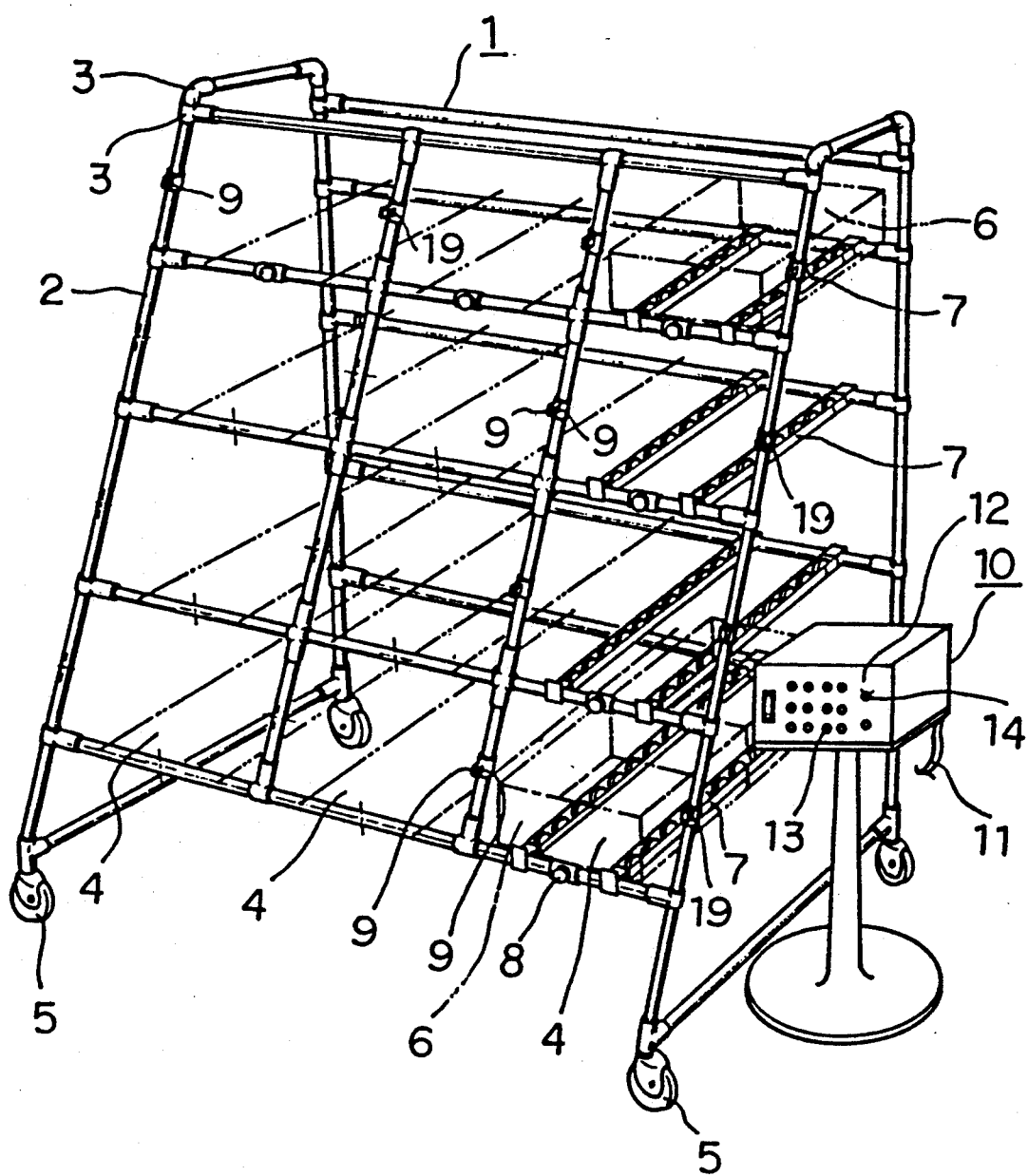
FIG. 1 is a perspective view of a preferred embodiment of the gravity-feed flow-rack storage system constructed in accordance with a preferred embodiment and best mode of the present invention.

Referring first to FIG. 1, the storage system according to a preferred embodiment of this invention comprises a structure of vertical and horizontal metal rods or pipes 2, preferably sheathed in a plastic resin material, assembled and constructed into a storage rack unit 1 by bracing them unto place with joints 3. The joints 3, as can be seen in the drawing, must come in different types, such as tees, elbows and crosses, depending on how the pipes 2 are coupled. To illustrate, where pipes 2 are intersected, a cross joint 3 is used, and an elbow joint 3 connects pipes 2 when they perpendicularly met end-to-end.

The rack unit 1 is divided into a number of box cells 4 defined by horizontal and vertical pipes 2. Also, the rack unit 1 is provided at its bottom with casters 5 for free wheeling of the unit. The cells 4 are provided to shelve parts or stock 6 by category, each having a number of conveyor channels 7 in the floor with mounted wheel elements or rollers as shown to facilitate the gravity flow of stock 6 in and out of the cells 4. The conveyor channels 7 are two for each cell 4 in this particular embodiment of the gravity-feed rack system 1, but the number is a matter of choice and can be increased depending on the weight of the stock 6 shelved.

Each of the cells 4 is provided at a front end thereof with one of a plurality of indicator lamps 8 which identifies the specific cell from which the stock 6 shelved therein is to be picked. In addition, each cell 4 has a photoelectric sensor 9 and a mirror 19 also mounted at a front end thereof. In each cell 4, the photoelectric sensor 9 and the mirror 19 are so situated with respect to each other, so that the passage of stock 6 out of the cell 4 is detected as the light beam reflected from the mirror 19 to the sensor 9 is blocked by the stock being moved from the cell.

Figure 2:
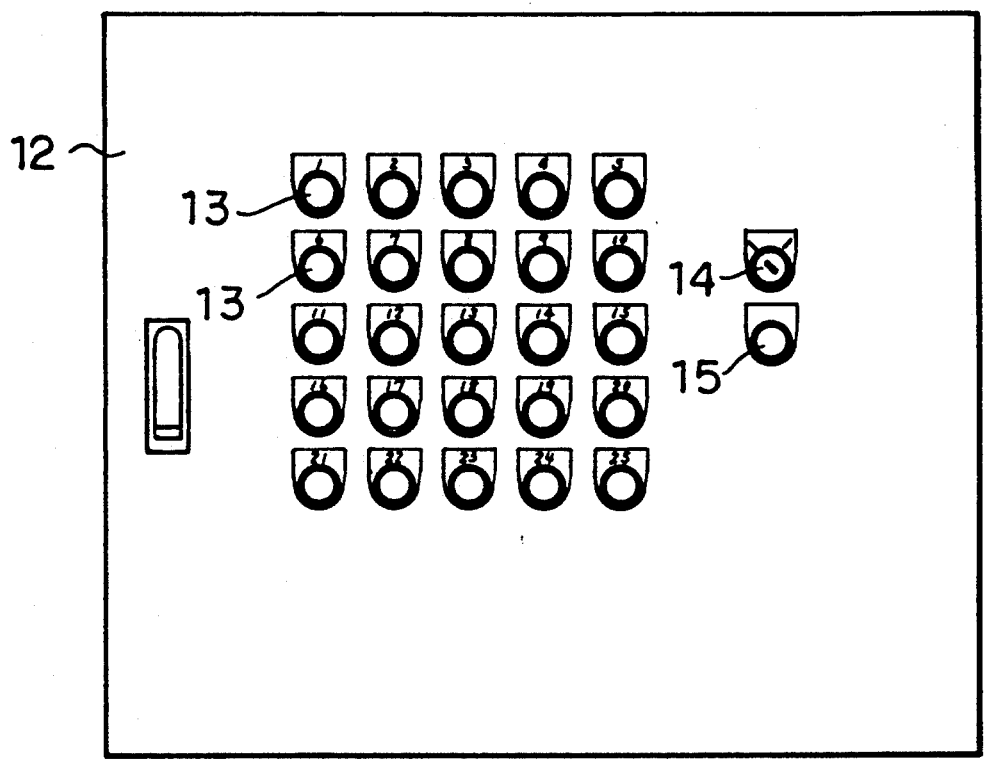
FIG. 2 is a schematic plan view of a control panel used in the preferred embodiment of this invention shown in FIG. 1.

The indicator lamps 8, along with the photoelectric sensor 9, are electrically connected through a cable 11 to a stock electronic pick-up control unit 10, which may be place adjacent to the rack unit 1. The electronic control unit 10 may be a programmable controller of any known type. Referring then to FIG. 2, the control unit 10 includes an operation panel 12 on which are arranged a selection switch 14 and a related number of operation buttons 13 to the number of cell 4 in the rack unit 1. Each operation button 13 conveys information on production line order for manufacture of a selected or a different kind of product. The selection switch 14 may be a toggle and selects between a first stock selection position for selecting indicator lamps 8 for guiding unloading access to the rack unit 1 and a second pick-up position to do the stock unloading, as will later be explained in detail.

Each of the buttons 13 is electrically connected to one of the photoelectric sensors 9, and each button 13 turns on or off its associated sensor 9. When a wrong cell 4 is picked, the photoelectric sensor 9 senses the passage of the stock 6 from that cell, and energizes a buzzer, not shown, that is operatively connected to the sensors 9. In addition, each button 13 is electrically connected to one of the indicator lamps 8, and is set to input information in a memory, not shown, in the control 10 to cause the connected indicator lamp 8 to come on, identifying the related cell 4 to be picked.

Setting the buttons 13 for stock pick-up operation or adjustment to accommodate change of pick-up on the panel 12 will be explained, with respect to FIG. 2.

The designation of cells 4 to be picked for a specific group of stock 6 is done on operation buttons 13. This is done when the selection switch 14 is moved to the first stock selection position. When a particular cell 4 is selected for the stock 6 shelved therein, the associated button 13 is pressed to store in the memory of the control unit a command ordering the related indicator lamp 8 to light up for that cell 4. When a plurality of cells 4 in the rack unit 1 are involved for a specified group of stock 6, the same steps should be followed to input data for lighting-up of the associated lamps 8 for the cells 4 by depressing the related combination of operation buttons 13.

It is so proposed that interrupting the beam between the photoelectric sensor 9 and the mirror 19 in the cell 4 associated to that button 13, as by inserting a hand into that cell, causes the sensor to order the lamp 8 to come on. This lighting-up results in inputting the relation of the lamp 8 with the button 13 into the memory of the control unit 10, identifying the cell 4, which will be eventually picked up.

When the selection switch 14 is shifted to the second pick-up position, the button 13 is set for stock pick-up operation. When the button 13 is pressed, the associated indicator lamp 8 lights up to indicate the cell 4 for stock pick-up operation. In this way, depressing a selected group of buttons 13 on the panel 12 enables operators to designate the cells 4 to be picked for the desired set of stock 6 shelved therein. Also, the signal received from the photoelectric sensor 9 is turned on to do the detection.

When the pick-up operation is adjusted for a different combination of stock 6, the selection switch 14 is shifted to the reset position. If additional cell 4 to be picked is specified, the associated button 13 is pressed to designate the indicator lamp 8 for that cell following the steps mentioned above. When an already selected cell 4 should be eliminated from the next round of pick-up operation, the procedure is as follows:

First, the operation button 13 for the cell 4 to be cancelled are depressed, and a cancel button 15 on the panel 12 is pushed to erase the data in the memory of the control unit 10 to energize the connected indicator lamp 8 at that cell 4.

After all changes were incorporated by manipulating the operation buttons 13 and the cancel button 15 for the next set of cells 4 to be picked, the light beam between all the paired photoelectric sensors 9 and mirrors 19 in each of the selected cell 4 should be interrupted, as by the insertion of a hand in the way of the light, to enable the designated indicator lamps 8 to come on. When the selection switch 14 is shifted to the pick-up position again, the rack unit 1 is ready for unloading operation on the newly selected cells 4.

In a modified version of the embodiment, the selection switch 14 is adapted to accommodate applications which involve fairly large changes in the seleciton of cells 4 to be picked from the operation panel 12. To specify, the selection switch 14 comprises a first addition position which enable buttons 13 to designate the indicator lamps 8 for a newly added group of cells 4 to be picked and a second cancel position which has the function of the earlier embodiment's cancel button 15, but doing the data deletion wholesale. The switch 14 of this modified embodiment also has a third pick-up position, the function of which is substantially similar to the second pick-up position of the first embodiment.

Figure 3:
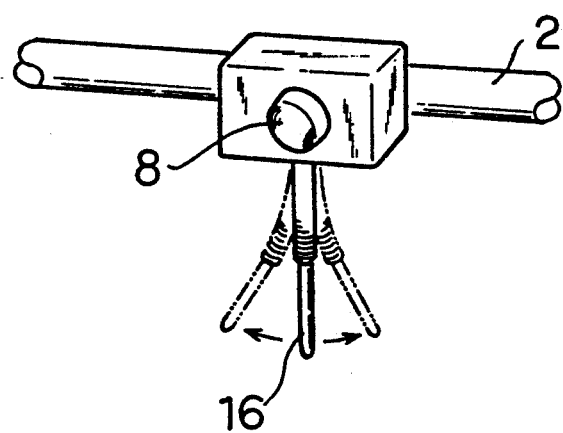
FIG. 3 is a perspective view of the important part of a box-like rack cell in the storage system according to a modification of the embodiment of FIG. 1 of the present invention.

In either of the embodiments described above, the paired or set of photoelectric sensor 9 and mirror 19 installed in each cell 4 is provided to set the input of data for energying the indicator lamps 8 for the selected cells 4 to be picked. However, the option is only a matter of illustration, and any suitable device that produces the same effect can also be used. For example, as shown in FIG. 3, a combination of a limit switch 16 operatively connected to an indicator lamp 8 and an access switch may also be employed.

It will be appreciated from the above that the rack unit 1 according to the present invention provides an easy-to-operate system which enables even untrained factory workers to arrange or adjust the stock unloading operation from a selected group of cells 4 to be picked.

What is claimed is:

1. A storage system comprising
   a plurality of gravity-feed flow-rack cells forming a rack unit for shelving different stock,
   each of the cells carrying at a front end thereof
   (a) and sensor means adapted to monitor selective access to each of the cells, and
   (b) an indicator lamp adapted to provide guidance and indication for the selective access to the stock shelved therein,
   an electronic control unit having a plurality of operation buttons and simultaneously receiving a signal from the sensor means and for transmitting information on production line orders each responsively associated with one of the indicator lamps,
   a memory in the control unit, and
   a selection switch for switching a signal which selects between a first stock-selection position and a second pick-up position, wherein when the first position of the selection switch permits the setting or resetting of the operation buttons and the simultaneously receiving of the signal from the sensor means to input in the memory of the control unit data for designating responsive indicator lamps to come on for stock-unloading access to a predetermined group of cells input in the memory, and when the selection switch is in the second pick-up position which sets the rack unit for unloading from the cells, the signal received from the sensor is turned on to do detection thereof.

2. A storage system as set forth in claim 1, wherein the sensor means comprises a set of a photoelectric sensor and a mirror.

3. A storage system as set forth in claim 1, wherein the sensor means comprises a limit switch operatively connected to an indicator lamp and an access switch.

4. A storage system as set forth in claims 1, 2, or 3, wherein the control unit is constructed and arranged to govern at least one of a plurality of similar rack units simultaneously.

5. A storage system as set forth in claim 1, wherein the sensor means is connected to a buzzer which sounds a warning in response to an unwanted access.

* * * * *